(No Model.)
G. S. GATES.
MACHINE SHAFT AND ITS BEARINGS.
No. 294,989. Patented Mar. 11, 1884.
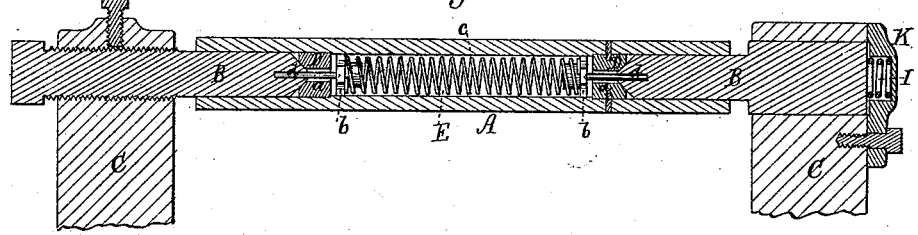
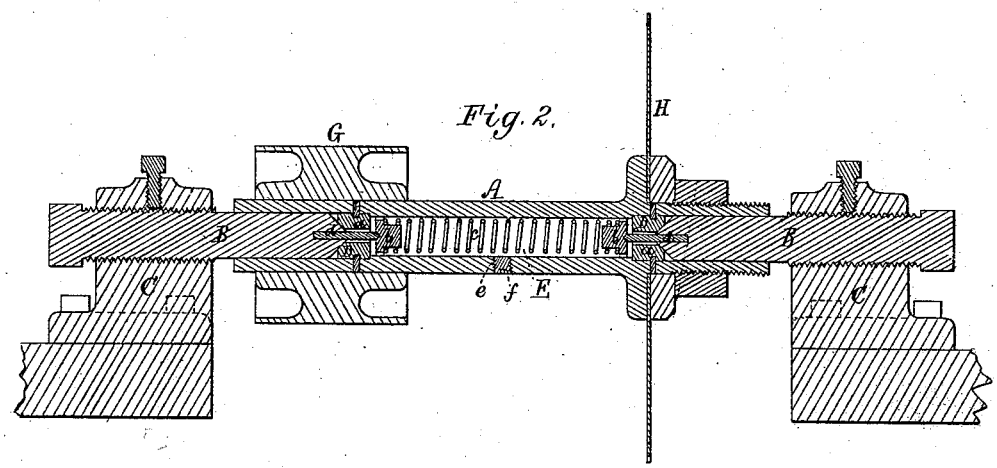
Witnesses
S. N. Piper
E. B. Pratt
Inventor.
Geo. Shattuck Gates
by R. H. Eddy, atty.

UNITED STATES PATENT OFFICE.

GEORGE SHATTUCK GATES, OF ATHOL, MASSACHUSETTS.

MACHINE-SHAFT AND ITS BEARINGS.

SPECIFICATION forming part of Letters Patent No. 294,989, dated March 11, 1884.

Application filed January 16, 1884. (No model.)

*To all whom it may concern:*

Be it known that I, GEORGE SHATTUCK GATES, of Athol, in the county of Worcester, of the Commonwealth of Massachusetts, have invented a new and useful Improvement in Machine-Shafts and their Bearings; and I do hereby declare the same to be described in the following specification and represented in the accompanying drawings, of which—

Figures 1 and 2 are longitudinal sections of a horizontal shaft and its bearings provided with my invention, the nature of which is defined in the claims hereinafter presented.

The main or principal object of the invention is the proper lubrication of the rubbing surfaces of the bearings of the shaft. To this end I make the shaft chambered or tubular, to contain the oil or lubricating liquid or matter, and I have to the chamber a valve-seat at one or each end of it, and I also have an educt or passage leading from such valve-seat to the bearing-surfaces of the step or pivot. To the valve-seat I have a valve, which, with a spring for forcing it to the seat, I arrange in the bore or chamber of the shaft. Furthermore, I have what I term the "valve-opener," which is a pin having a diameter less than that of the educt, such pin being arranged in the educt, and extended from the valve to the pivot, and of a length for it, (the said pin,) when the pivot and step are forced in contact, to act against and crowd the valve off its seat, so as to enable oil to flow from the said bore or chamber through the educt and to the bearing-surfaces of the step and pivot, in order to lubricate them.

In the drawings, A denotes the shaft, which is represented as tubular, and having extended within it at each end a pivot, B. In Fig. 2 the pivots are shown as screwed into and through vertical posts C C. Each pivot at one end bears against a step, D, which is represented as constituting one terminus of the oil reservoir or chamber E in the shaft. From the said chamber an educt or passage, *a*, leads through the step. The inner end of the step is the seat for a valve, *b*, which is provided with a spiral spring, *c*, to force it toward the seat. The drawings show one spring to the two valves in the oil chamber or bore of the shaft. Each pivot is also shown as provided with a valve-opener, *d*, which, when the pivot is close into the step or takes a bearing therein, extends through the step a short distance into the oil-chamber, so as to hold the valve off its seat. From the above it will be seen that on the pivot being withdrawn from the step the spring will close the valve or force it to its seat, so as to prevent the escape of oil from the chamber. To the chamber there may be an opening, *e*, for supply of oil to the said chamber, such opening being provided with a plug, *f*.

In Fig. 2 the shaft is shown as furnished with a driving-pulley, G, and also with a circular saw, H.

In Fig. 1 one of the pivots or pivotal journals is represented as having against its outer end a spring, I, arranged within a housing, K. Such spring, when the journal is in place in the shaft, serves to keep the bearing-surfaces of the step and the end of the journal in contact, and saving the necessity of having a screw, as in Fig. 2, to force the pivot to the step, especially as they may become worn.

My invention may be applied to vertical or inclined shafts as well as to horizontal ones.

I claim—

1. The combination, with the tubular or chambered shaft and one or each of its steps, and the pivot or pivoted journal thereof, of the spring and valve and valve-seat arranged within the shaft, the educt leading from such seat to the bearing-surfaces of the step and pivot or pivoted journal, and the valve-opener extended into and through the educt, all being applied and for use and to operate substantially as set forth.

2. The combination, with the tubular shaft and its pivotal journals, and steps arranged in it, and provided with educts and valve-seats, as set forth, of the valve-openers extended from the journals through the educts and the valves and their spring arranged in the shaft and between the valve-seats, all being substantially as represented.

GEORGE SHATTUCK GATES.

Witnesses:
R. H. EDDY,
S. N. PIPER.